United States Patent Office 3,205,240
Patented Sept. 7, 1965

3,205,240
EPOXY ESTERS OF BORON ACIDS
James W. Shepherd, Gibsonia, Pa., assignor to Callery Chemical Company, Pittsburgh, Pa., a corporation of Pennsylvania
No Drawing. Filed Apr. 14, 1961, Ser. No. 102,918
4 Claims. (Cl. 260—348)

This invention relates to new epoxy-containing esters of boron acids in which the properties of complex boron esters and the unique properties of epoxy compounds are combined, and to a method for producing such esters.

Throughout this specification, "boric acid" refers to what is sometimes called orthoboric acid and has the formula $B(OH)_3$. "Boronic acids" refer to compounds of the formula $RB(OH)_2$, and "borinic acids" are those boron acids having the formula $R_2B(OH)$, where in each case R refers to organo groups. Similarly, "trialkyl borates" and "triaryl borates" are esters of boric acid, sometimes called orthoborates, while esters of boronic acids are called boronates and esters of borinic acids are called borinates. The term "epoxy group" is used herein as it is conventionally understood and refers to a linkage of the structure

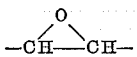

The new compounds of this invention comprise three general types: epoxy esters of boric acid or borates; epoxy esters of boronic acids, or boronates; and epoxy esters of borinic acids or borinates.

The esters of boric acid can be represented by the general formula $B(OR)_3$ where R is epoxyalkyl, epoxyaryl, epoxyalkaryl, epoxyaralkyl, epoxycycloalkyl or epoxyalkylene.

The epoxy esters of boronic acids have the general formula $R'B(OR)_2$ where R is as defined above and R' is alkyl, aryl, aralkyl, alkaryl, cycloalkyl or alkylene. Esters of diboronic acids are also included; as for example, those of the formulas $(RO)_2B(CH_2)_nB(OR)_2$, where $n$ is 1 to 12, and

In such esters, R' is considered as di(epoxyalkoxy)boryl alkyl and di(epoxyalkoxy)boryl phenyl.

The epoxy esters of borinic acids have the formula $R'_2BOR$, where R and R' are as defined above.

As is apparent from the above discussion, in each of the esters included within the scope of my invention the organoxy radicals contain epoxy groups. The preferred boron acid esters, i.e., those which we have found to be most desirable for the uses presently contemplated for these compounds, are those epoxy esters of the above formulas in which R is epoxyalkyl and R' is alkyl.

It may be noted that the borinic acid esters of my invention are somewhat less stable than the boric acid and boronic acid esters in that they tend to thermally decompose. While this limits their suitability for some purposes, it makes them particularly desirable for some applications in which their decomposition provides the desired type of fragments or molecules in the composition produced.

The new esters described above are produced by reacting an epoxy alcohol having the desired epoxy group with a boron acid or a boron ester. The term "epoxy alcohol" as used herein includes any compound having the formula ROH, where R is epoxyalkyl, epoxyaryl, epoxyalkaryl, epoxyaralkyl, epoxycycloalkyl or epoxyalkylene. Epoxy esters are produced when any such epoxy alcohol is reacted with boric acid, a boronic acid, a borinic acid, or with an ester of one of these acids, i.e., a borate, a boronate or a borinate.

The conditions of the above reaction by which the epoxy esters are produced are not critical. Ordinary ambient temperatures and pressures are generally usable, although it is usually preferred to heat the reactants somewhat in order to accelerate the rate of reaction. While no solvent is necessary to the operability of the method, I have found that a solvent which azeotropes with water aids in driving the reaction to completion and facilitates removal of the by-product water and recovery of the product. This is accomplished by distilling off an azeotropic mixture of the solvent and water during the reaction period. Any solvent which is not reactive with the reactants and products in the system and which forms an azeotrope with water can be used. However, it should be noted that alcohols should in general be avoided as a solvent, since they may interact with the acids or esters present to produce different and undesired esters. Benzene is a satisfactory solvent for use in producing epoxy esters in general and I prefer to use this solvent in practicing the above method, although other solvents which azeotrope with water, such as toluene or xylene, can also be used.

The invention will be discussed further in conjunction with several detailed examples which follow. These examples, however, are not to be construed as limiting the invention to their details but are given as illustrative of the class of compounds produced and the method of their production.

Example 1

To 5.1 grams (0.05 mol) of butyl boronic acid was added 7.4 grams (0.10 mol) of 2,3-epoxypropanol-1 in 100 ml. of benzene. The mixture was refluxed and the water formed during esterification was removed by azeotropic distillation of the benzene-water azeotrope. After about 2 hours, the theoretical amount of water had been collected. The benzene solvent was removed by distillation, leaving 8.6 grams of di(2,3-epoxypropyl)n-butylboronate, a colorless liquid. The yield was 80% of theory.

Example 2

A 250 cc. round-bottomed flask was charged with 16.2 grams (0.054 mol) of n-octadecyl boronic acid, 8.0 grams (0.018 mol) of 2,3-epoxpropanol and 100 ml. of benzene. The mixture was heated to reflux and the water formed was removed by azeotropic distillation. After the water had been removed, the remaining solvent was distilled off leaving 22.5 grams of di(2,3-epoxypropyl) n-octadecylboronate, a light colored solid having a melting point of 35 to 39° C.

Example 3

7.45 grams (0.025 mol) of octadecyl boronic acid and 14.2 grams (0.05 mol) of 9,10-epoxystearyl alcohol were heated in benzene and the water produced was removed by azeotropic distillation. The benzene was removed by distillation under reduced pressure and 19.0 grams, a 92% yield, of di(9,10-epoxystearyl)octadecylboronate was obtained.

Example 4

20.4 grams (0.20 mol) of n-butyl boronic acid was esterified with 113.6 grams (0.40 mol) of 9,10-epoxystearyl alcohol in 250 cc. of benzene. The water and solvent were removed by distillation. 124 grams of di(9,10-epoxystearyl) n-butylboronate was obtained. This product was a light yellow liquid having a density of 0.90; the yield was 98%.

Example 5

A mixture of 28.4 grams (0.10 mol) of 9,10-epoxystearyl alcohol, 2.07 grams (0.033 mol) boric acid, and 150 ml. benzene was heated to reflux and a benzene-water azeotrope distilled off. After 20 hours, the theoretical amount of water had been collected. The remaining benzene was removed by distillation leaving 28.9 grams of tri-(9,10-epoxystearyl)borate, a pale green liquid having 4.37% oxirane oxygen.

*Example 6*

2.58 grams (0.0182 mol) of di-n-butyl borinic acid was reacted with 5.16 grams (0.0182 mol) of 9,10-epoxystearyl alcohol using 60 ml. of benzene as a solvent. The reaction mixture was refluxed in a nitrogen atmosphere for 7 hours, during which time the water formed was removed by azeotropic distillation. The solvent was removed by distillation at 50° C. under reduced pressure, leaving 5.9 grams of 9,10-epoxystearyl di-n-butylborinate, a pale yellow liquid with 3.33% oxirane.

*Example 7*

2.067 grams (0.033 mol) of boric acid was esterified with 24.5 grams of epoxidized linseed alcohol. The alcohol had an oxirane content of 6.69% and a hydroxyl value of 226; it was 12% saturated, 25% mono-unsaturated, 54% di-unsaturated and 9% tri-unsaturated. The reaction mixture was refluxed for 12 hours and the water was removed by azeotropic distillation with benzene. There was recovered 15.0 grams of tri-(epoxidized linseed)borate; this product was a clear, viscous liquid which formed a waxy solid after several days. It contained 5.69% oxirane oxygen.

*Example 8*

2.067 grams of boric acid was reacted with 26.9 grams of epoxidized soybean alcohol (7.39% oxirane, 256 hydroxyl value, 18% saturated, 17% mono-unsaturated, 15% di-unsaturated, 50% tri-unsaturated) in 125 ml. benzene for 16 hours. Removal of the water and benzene gave 19.4 grams of tri-(epoxidized soybean)borate, a very viscous, clear liquid having 6.01% oxirane.

Other epoxy esters are produced in a similar manner to the above examples by using the procedures detailed therein. Table I below lists several specific examples of esters of the formula $B(OR)_3$ produced from boric acid or boric acid esters.

*Table I*

| Epoxy alcohol | Boric acid or ester | Product |
|---|---|---|
| 2,3-epoxypropanol | Trimethylborate | Tri-(2,3-epoxypropyl)borate. |
| 2,3-epoxypropanol | Boric acid | Tri-(2,3-epoxypropyl)borate. |
| 3,4-epoxyhexanol | Trimethylborate | Tri-(3,4-epoxyhexyl)borate. |
| 2,3-epoxypropanol | Triphenylborate | Tri-(2,3-epoxypropyl)borate. |
| 2,3-epoxypropanol | Tri(cyclohexyl)borate | Tri-(2,3-epoxypropyl)borate. |
| 2,3-epoxypropanol | Tribenzylborate | Tri-(2,3-epoxypropyl)borate. |
| 3,4-epoxybutanol | Triallylborate | Tri-(3,4-epoxybutyl)borate. |
| 3,4-epoxybutanol | Tri(cyclohexenyl)borate | Tri-(3,4-epoxybutyl)borate. |
| p-(2,3-epoxypropoxy)phenol | Trimethylborate | Tri[p-(2,3-epoxypropoxy)phenyl]borate. |
| 9,10-epoxystearyl alcohol | Boric acid | Tri-(9,10-epoxystearyl)borate. |
| Epoxycyclohexanol | Boric acid | Tri-(epoxycyclohexyl)borate. |

Epoxy esters of boronic acids of the formula $R'B(OR)_2$ are also prepared in the above manner from boronic acids or boronic acid esters. Table II gives some examples.

*Table II*

| Epoxy alcohol | Boronic acid or ester | Product |
|---|---|---|
| 2,3-epoxypropanol | n-Butyl boronic acid | Di-(2,3-epoxypropyl)n-butylboronate. |
| 3,4-epoxybutanol | Benzyl boronic acid | Di-(3,4-epoxybutyl)benzylboronate. |
| 3,4-epoxybutanol | Dimethyl phenylboronate | Di-(3,4-epoxybutyl)phenylboronate. |
| 9,10-epoxystearyl alcohol | Dibutyl o-cresylboronate | Di-(9,10-epoxystearyl)o-cresylboryonate. |
| 2,3-epoxy-2-ethylhexanol | n-Butyl boronic acid | Di-(2,3-epoxy-2-ethyl-hexyl)n-butylboronate. |
| 3,4-epoxy-6-methyl cyclohexylmethyl alcohol | n-Dodecyl boronic acid | Di-(3,4-epoxy-6-methyl cyclohexylmethyl) dodecyl boronate. |
| Epoxycyclohexanol | n-Butyl boronic acid | Di-(epoxycyclohexyl)n-butyl boronate. |
| 2,3-epoxypropanol | 1,4-bis(dihydroxyboryl)benzene | 1,4-bis[di-(2,3-epoxypropoxy)boryl]benzene. |
| 3,4-epoxyhexanol | 1,4-bis(dihydroxyboryl)butane | 1,4-bis[di-(3,4-epoxyhexoxy)boryl]butane. |

Esters of borinic acids of the formula $R'_2B(OR)$, also made as described above, include the examples in Table III.

*Table III*

| Epoxy alcohol | Borinic acid or ester | Product |
|---|---|---|
| 2,3-epoxypropanol | Di-n-butyl borinic acid | 2,3-epoxypropyl di-n-butylborinate. |
| 3,4-epoxyhexanol | Phenyl ethyl borinic acid | 3,4-epoxyhexyl phenylethylborinate. |
| Epoxycyclohexanol | Methyl dicyclohexylborinate | Epoxycyclohexyl dicyclohexylborinate. |
| 2,3-epoxypropanol | Diallyl borinic acid | 2,3-epoxypropyl diallylborinate. |
| p-(2,3-epoxypropoxy)phenol | Ethyl di-n-butylborinate | p-(2,3-epoxypropoxy)phenyl di-n-butylborinate. |
| Epoxydodecyl alcohol | n-butyl di-n-butylborinate | Epoxydodecyl di-n-butylborinate. |

The products and compounds produced in the above examples were identified by chemical analysis (including oxirane), infra-red analysis and, in some cases, X-ray diffraction analysis. Among the identifying characteristics shown by infra-red spectra of these compounds are the presence of epoxy groups, the presence of boron-oxygen bonds and the presence or absence of hydroxyl groups. As an example of the method used to identify the compounds of my invention, chemical analysis of the product of Example 4 above, di(9,10-epoxystearyl) n-butylboronate, showed that it contained 67.5% carbon and 12.5% hydrogen, compared with the calculated composition of this compound of 68.2% carbon and 12.5% hydrogen. The oxirane oxygen content of the compound was 4.18%. The epoxy group was shown in the infra-red spectra of the compound by absorbence at 11.2 microns and the presence of boron-oxygen bonds and the absence of hydroxyl groups were also demonstrated by examination of the unique infra-red spectrum obtained from this product.

The epoxy esters of this invention have several uses. For example, they are stabilizers for vinyl chloride polymers and when incorporated therewith prevent or retard the thermal and oxidative decomposition of such polymers. The epoxy esters can also be polymerized to produce epoxy resins. For example, di-(9,10-epoxystearyl) n-butylboronate when mixed with about 14% by weight of trimethoxyboroxine formed a tough, resilient and slightly rubbery polymer. Treatment of any of the above-described epoxy esters of boron acids in the manner in which conventional epoxy resins are formed produces epoxy resins applicable to similar uses as the conventional epoxy resins, but having slightly different and more desirable properties.

According to the provisions of the patent statutes, I have explained the principle and mode of practicing my invention and have described what I now consider to be its best embodiments. However, I desire to have it understood, that within the scope of the appended claims, the invention may be practiced otherwise than as specifically described.

I claim:
1. An epoxy ester of boric acid of the formula $B(OR)_3$ where R is epoxyalkyl.
2. An epoxy ester of a boronic acid of the formula $R'B(OR)_2$, where R is epoxyalkyl and R' is alkyl.
3. An epoxy ester of a borinic acid of the formula $R'_2BOR$, where R' is alkyl and R is epoxyalkyl.
4. An epoxy ester of a boron acid of the formula selected from the group consisting of $B(OR)_3$, $R'B(OR)_2$ and $R''_2BOR$, where R is epoxyalkyl, R' is selected from the group consisting of alkyl, phenyl, benzyl and o-cresyl, and R'' is selected from the group consisting of alkyl, cyclohexyl, phenyl and benzyl.

References Cited by the Examiner
UNITED STATES PATENTS

| | | | |
|---|---|---|---|
| 1,668,797 | 5/28 | Bannister. | |
| 2,523,433 | 9/50 | Irany | 260—462 |
| 2,524,432 | 10/50 | Dorough | 260—348 |
| 2,650,908 | 9/53 | Beears | 260—462 |
| 2,856,369 | 10/58 | Smith et al. | 260—348 |
| 2,987,537 | 6/61 | McCloskey et al. | 260—462 |
| 3,030,392 | 4/62 | Bralley et al. | 260—462 |
| 3,030,406 | 4/62 | Washburn et al. | 260—462 |

WALTER A. MODANCE, *Primary Examiner.*
IRVING MARCUS, NICHOLAS RIZZO, *Examiners.*